United States Patent
Jahn et al.

(10) Patent No.: US 12,296,658 B2
(45) Date of Patent: May 13, 2025

(54) VEHICLE DOOR HAVING A RESONANT BODY COMPONENT FOR A LOUDSPEAKER, AND ASSEMBLY METHOD

(71) Applicant: BROSE FAHRZEUGTEILE SE & CO. KOMMANDITGESELLSCHAFT, BAMBERG, Bamberg (DE)

(72) Inventors: Michael Jahn, Bad Staffelstein (DE); Norman Hümmer, Ebensfeld (DE); Hans Herzog, Strullendorf (DE); Stephanie Wurpes, Bamberg (DE); Joachim Müller, Werneck (DE)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 0 days.

(21) Appl. No.: 18/017,799

(22) PCT Filed: Jul. 21, 2021

(86) PCT No.: PCT/EP2021/070323
§ 371 (c)(1),
(2) Date: Jan. 24, 2023

(87) PCT Pub. No.: WO2022/018112
PCT Pub. Date: Jan. 27, 2022

(65) Prior Publication Data
US 2023/0271485 A1    Aug. 31, 2023

(30) Foreign Application Priority Data
Jul. 24, 2020 (DE) .................. 10 2020 209 381.4

(51) Int. Cl.
*B60J 5/00* (2006.01)
*B60J 5/04* (2006.01)
(Continued)

(52) U.S. Cl.
CPC .......... *B60J 5/0413* (2013.01); *B60J 5/0418* (2013.01); *H04R 1/025* (2013.01); *H04R 1/2811* (2013.01);
(Continued)

(58) Field of Classification Search
CPC .......... B60J 5/0413; B60J 5/0418; B60J 1/17; H04R 1/025; H04R 1/2811; H04R 1/2819;
(Continued)

(56) References Cited

U.S. PATENT DOCUMENTS

| | | | |
|---|---|---|---|
| 6,226,927 | B1 | 5/2001 | Bertolini et al. |
| 6,367,202 | B1 | 4/2002 | Reed et al. |

(Continued)

FOREIGN PATENT DOCUMENTS

| | | | |
|---|---|---|---|
| DE | 19717908 A1 | 10/1998 | |
| DE | 19823363 C1 | 7/1999 | |

(Continued)

*Primary Examiner* — Daniel J Troy
*Assistant Examiner* — Daniel Alvarez
(74) *Attorney, Agent, or Firm* — Dickinson Wright PLLC

(57) ABSTRACT

A vehicle door includes a wet space provided within the vehicle door, which is separated from a dry space on the vehicle door, wherein the vehicle door includes at least a door skin that borders the wet space and dry space, a speaker, and a resonance body component configured to form a resonance space for the speaker, wherein the resonance body component defines a closed volume for the resonance space in the wet space of the vehicle door.

23 Claims, 14 Drawing Sheets

(51) Int. Cl.
*H04R 1/02* (2006.01)
*H04R 1/28* (2006.01)
*B60J 1/17* (2006.01)

(52) U.S. Cl.
CPC ......... *H04R 1/2819* (2013.01); *H04R 1/2826* (2013.01); *H04R 1/2857* (2013.01); *B60J 1/17* (2013.01); *H04R 2499/13* (2013.01)

(58) Field of Classification Search
CPC . H04R 1/2826; H04R 1/2857; H04R 2499/13
See application file for complete search history.

(56) References Cited

U.S. PATENT DOCUMENTS

| | | | |
|---|---|---|---|
| 6,578,658 B2 | 6/2003 | Jones et al. | |
| 6,938,944 B2 * | 9/2005 | Koa | B60J 5/0418 296/1.11 |
| 7,913,455 B2 * | 3/2011 | Kruger | B60J 5/0416 49/502 |
| 2002/0134024 A1 | 9/2002 | Kim | |
| 2006/0000149 A1 | 1/2006 | Radu et al. | |
| 2007/0062123 A1 | 3/2007 | Kruger et al. | |
| 2009/0310812 A1 | 12/2009 | Close | |
| 2012/0250929 A1 | 10/2012 | Subat et al. | |
| 2020/0001688 A1 | 1/2020 | Fortin | |

FOREIGN PATENT DOCUMENTS

| | | | | |
|---|---|---|---|---|
| DE | 102006037157 A1 | 3/2007 | | |
| DE | 102013207627 A1 | 10/2014 | | |
| DE | 102017222630 A1 | 6/2019 | | |
| DE | 102019117313 A1 | 1/2020 | | |
| JP | H0314724 A | 1/1991 | | |
| JP | H0467549 | * 6/1992 | | B60J 5/04 |
| JP | H01067549 U | 6/1992 | | |
| WO | 2014006290 A1 | 1/2014 | | |
| WO | 2015040315 A1 | 3/2015 | | |

* cited by examiner

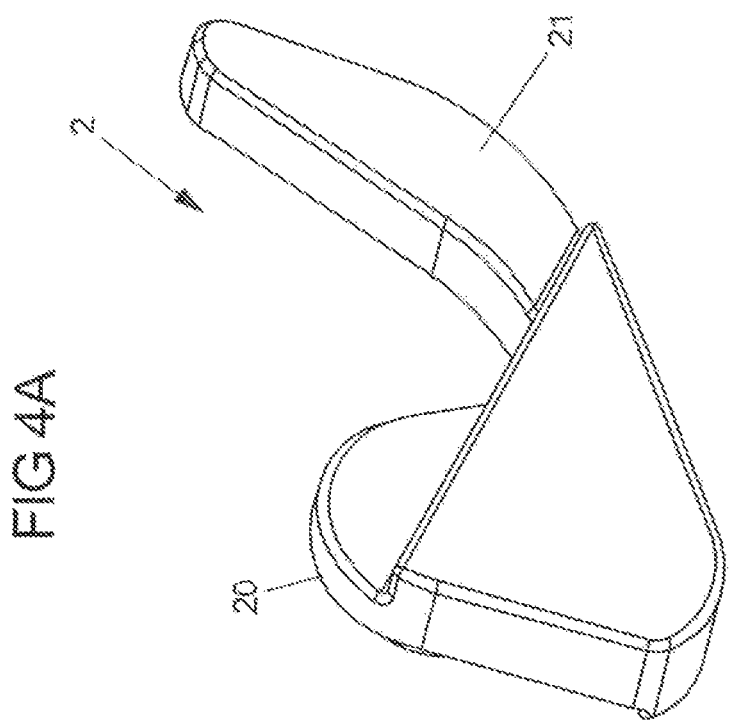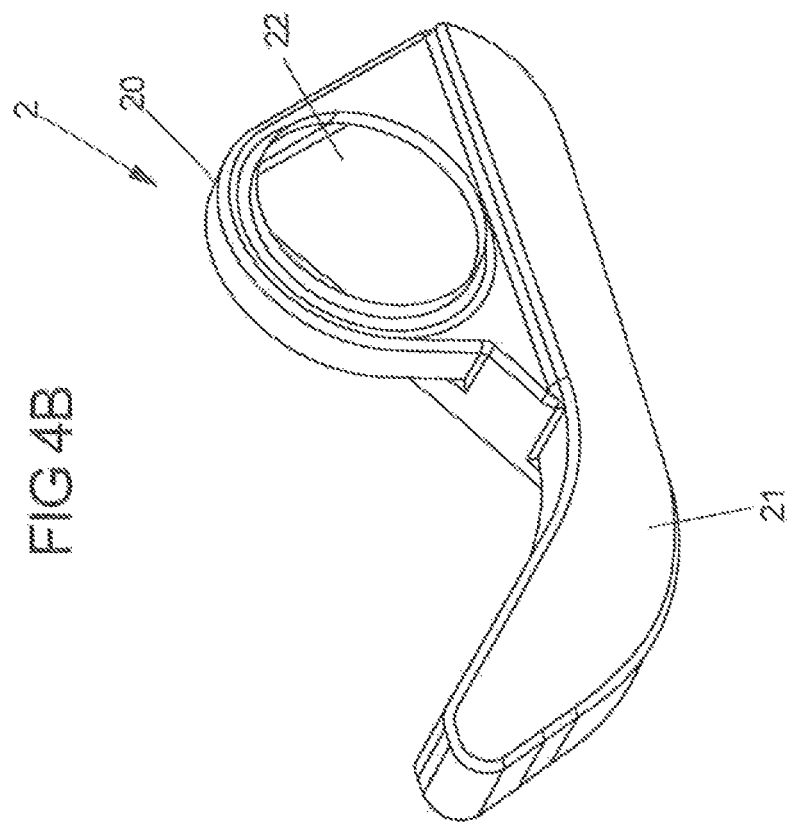

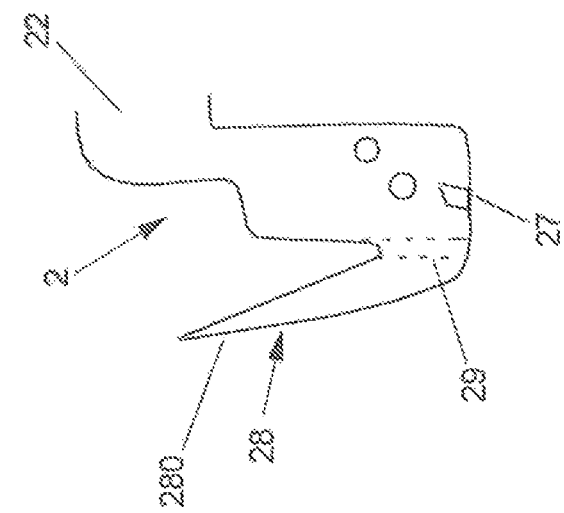
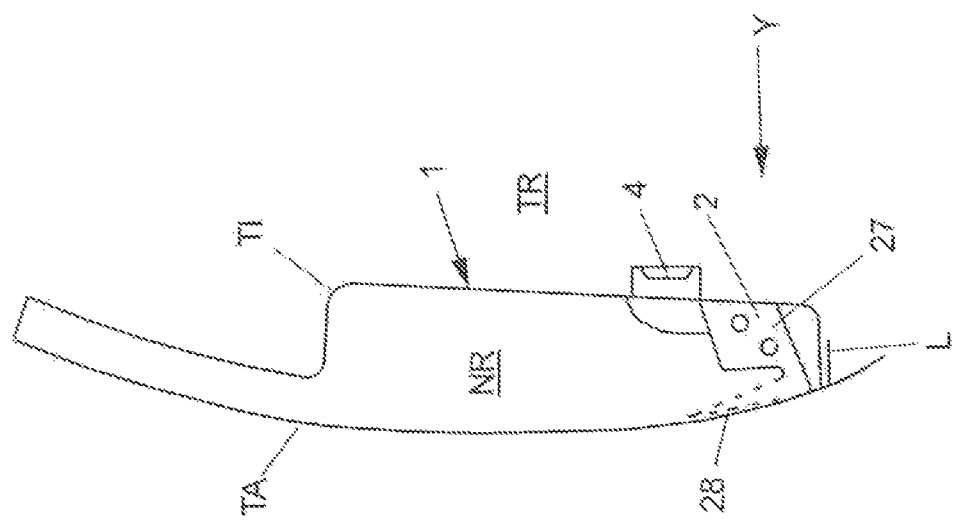

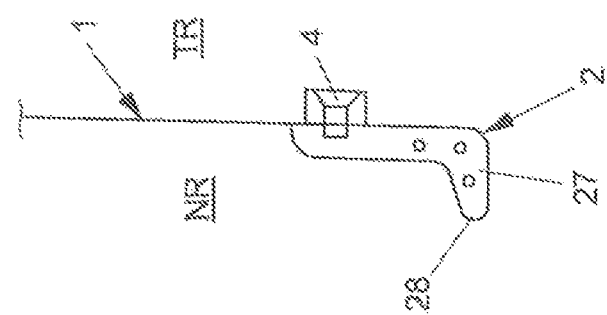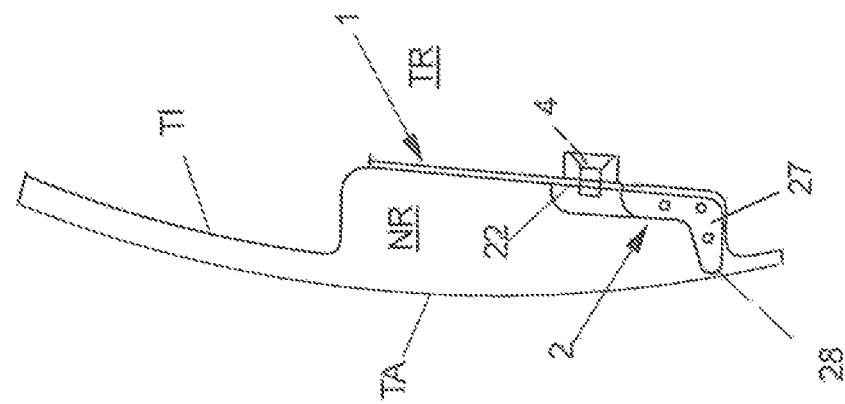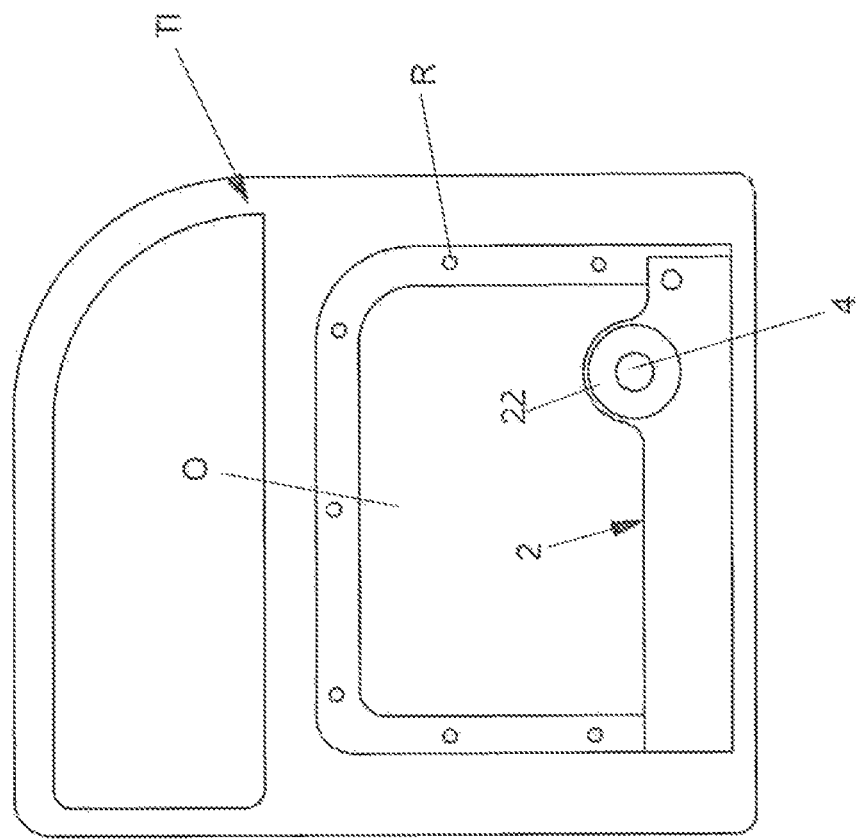

VEHICLE DOOR HAVING A RESONANT BODY COMPONENT FOR A LOUDSPEAKER, AND ASSEMBLY METHOD

CROSS-REFERENCE TO RELATED APPLICATIONS

This application is the U.S. National Phase of PCT/EP2021/070323 filed Jul. 21, 2021, which claims priority to German Application No. DE 10 2020 209 381.4 filed Jul. 24, 2020, the entire disclosures of which are incorporated by reference herein.

TECHNICAL FIELD

The proposed solution may relate to a vehicle door with a resonance body component for forming a resonance space within the vehicle door for a speaker.

BACKGROUND

It is known from practice to provide a resonance body for a speaker of a vehicle door within the vehicle door on a carrier component provided on the vehicle door for separating a wet space from a dry space. This resonance body is formed by at least one resonance body component that defines a resonance space for the speaker. A corresponding resonance body component, which usually is also referred to as "soundbox", usually is fixed to a dry-space side of the carrier component as an additional component and thereon forms a resonance space of defined size, but of comparatively small volume. Nevertheless, the use of a resonance body component possibly offers the advantage that a closed volume can be provided for the resonance space, which has an advantageous effect on the sound quality to be achieved with the speaker.

From DE 197 17 908 B4 it is furthermore known to form a resonance space by a profile molded to the carrier component itself. However, the solution proposed in DE 197 17 908 B4 leads to a comparatively large demand of installation space and possibly also disadvantageously impairs the design of an interior door trim on the dry-space side.

Against this background it therefore is the object underlying the proposed solution to provide an improved vehicle door with a resonance space for a speaker.

SUMMARY

This object is achieved both with a vehicle door and a mounting method described below.

In the embodiments described below, a vehicle door comprises a door skin that borders a wet space and a dry space of the vehicle door, a speaker and a resonance body component for forming a resonance space for the speaker on the vehicle door. It here is provided that the resonance body component for the resonance space defines a closed volume in the wet space of the vehicle door.

Thus, in the proposed solution a limited volume is defined via the resonance body component in the wet space of the vehicle door as a resonance space for the speaker. Installation space available in the wet space thereby is effectively used for a so-called "soundbox", so that an acoustic decoupling of a speaker membrane can be achieved in the wet space. The provision of a closed volume reduces the risk of an excitation of components of the vehicle door, such as a door outer skin and of components present in the wet space, by the sound pressure of the speaker. Thus, an effective reduction of disturbing noises can be achieved with an increase in audio quality at the same time. Via an arrangement of the resonance body component in the wet space along with an acoustic decoupling of the wet space in the region of the speaker, which can be achieved by the provided closed volume, it furthermore can also be avoided that sound emitted by the speaker is clearly audible for third parties outside the vehicle. This is of particular importance especially when the speaker is coupled to a hands-free system of the vehicle, as listening to a conversation from outside the vehicle becomes more difficult. Consequently, the privacy of a user of the vehicle can be improved.

For example, the resonance body component is configured with at least one component portion that is arranged on a first side of a door skin portion of the door skin facing the wet space. Thus, the resonance body component for example is fixed to a door skin portion of the door skin on the wet-space side. This for example includes the fact that a component portion of the resonance body component is located opposite the door skin in the properly mounted state of a speaker opening in the door skin portion so that a speaker fixed to the door skin and mounted to the door skin from the dry-space side is acoustically coupled to the resonance body component arranged on the wet-space side.

An arrangement of the resonance body component on a door skin portion of the door skin furthermore can include a variant in which the component portion of the resonance body component arranged on the wet-space side of the door skin portion is located opposite a carrier portion of a carrier component that is arranged on the dry-space side, wherein this carrier component then carries the speaker in a speaker opening on the side of the carrier component. For example, there can be provided a design variant in which the vehicle door comprises a carrier component fixed to the door skin for separating the wet space from the dry space and the resonance body component is (additionally) connected to the carrier component.

In accordance with one embodiment, there may be a vehicle door having at least one door skin, a carrier component fixed to the door skin for separating a wet space from a dry space on the vehicle door, and a speaker arranged on the carrier component. The additional resonance body component here is provided for forming the resonance space for the speaker within the wet space and is connected to the carrier component. With at least one component portion, the resonance body component is arranged on a first side of a door skin portion of the door skin facing the wet space. With at least one carrier portion, the carrier component in turn is arranged on a second side of the door skin portion facing the dry space, on which the component portion of the resonance body component is arranged on the wet-space side. Thus, in such a design variant the carrier component for example is arranged opposite the component portion of the resonance body component with at least one carrier portion on the second side of the door skin portion facing the dry space.

Thus, it is the basic idea underlying the proposed solution to arrange a resonance body component on a wet-space side of a portion of the door skin, for example of a door inner skin. This may include an assembly of the vehicle door, in which the resonance body component initially is arranged on the door skin within the wet space, before e.g. a possible carrier component is mounted to the door skin from the dry space. At the same time, the resonance body component—possibly in conjunction with the door skin (in case the resonance body component is closed only when mounted to the door skin) and optionally a carrier component likewise mounted to the door skin—a closed volume for the resonance space for the speaker is specified with a size defined by the dimensions of the at least one resonance body component. Consequently, the resonance body component can be configured like a housing and for example be mounted on a side of a door skin portion of the door skin facing the wet space so that, after termination of the assembly, the speaker protrudes into the resonance space of the resonance body component.

The door skin portion on which, on different sides facing away from each other, portions of the resonance body component and of the carrier component are arranged, in principle can be formed by an edge that borders an opening in the door skin, which is at least partly closed by the carrier component—for separating the wet space from the dry space. Such an opening in the door skin, for example in a door inner skin, ensures the accessibility of the wet space during the assembly of the vehicle door, and hence the arrangement of functional components of the vehicle doors within the wet space. For example, these are functional components of a window regulator for adjusting a window pane of the vehicle door, such as for example at least one guide rail along which the window pane is shiftable. A corresponding guide rail for example can be pre-mounted on the carrier component or be integrally formed thereon. By mounting the carrier component to the door skin and fixing the carrier component to the door skin, the at least one guide rail thereby is properly positioned within the wet space through the opening in the door skin. In such a variant, the arrangement of the resonance body component for example is effected on just one wet-space side of an edge of the door skin bordering the opening for the carrier component.

In principle, the door skin portion can at least partly be arranged between the at least one component portion of the resonance body component and the carrier component portion, such as in a sandwich-like manner. With reference to the design variant explained above, this for example includes the fact that along at least part of an edge that extends around the opening at least partly closed by the carrier component the door skin portion is arranged between portions of the resonance body component and the carrier component when the vehicle door has been properly mounted.

In one design variant, the carrier portion rests against the second side of the door skin portion (facing the dry space), on whose first side the at least one component portion of the resonance body component is arranged, and furthermore includes a speaker opening for the speaker. Thus, a carrier component-side speaker opening is provided just on that carrier portion which rests against the door skin portion on the dry-space side. Such a speaker opening is configured for example as a through opening in the carrier component so that the speaker held at the speaker opening at least partly protrudes through the speaker opening.

In a possible development, the speaker opening of the carrier component is aligned with a door skin-side speaker opening of the door skin. Such a door skin-side speaker opening can be formed for example by a cutout or a through opening in the door skin enclosed at its edge. The dimensions of the speaker opening of the carrier component and the door skin-side speaker opening of the door skin are adjusted to each other in such a way that the speaker held at the carrier component also can protrude through the speaker opening of the door skin and into the resonance space in the wet space of the vehicle door, which is formed with the resonance body component. In one example, at an edge of the door skin-side speaker opening at least one component portion of the resonance body component can rest against the first side of the door skin (facing the wet space).

In one design variant, the resonance space and hence a housing volume provided for the speaker can be defined by a resonance body component that extends exclusively along a door skin portion of the door skin and thus is located opposite the same. For example, this may include the fact that no component portion of the resonance body component protrudes beyond an edge of an opening in the door skin, which is at least partly closed by the carrier component mounted to the door skin. Alternatively, at least part of the resonance space can be defined by a component portion of the resonance body component located opposite the carrier component or by an additional resonance body component located opposite the carrier component.

In one design variant, the carrier component and the resonance body component are connected to the door skin at at least one fastening point via at least one common fastening element and fixed to the door skin. In this variant, the carrier component and the resonance body component thus are connected to a door bodyshell comprising the door skin at at least one fastening point via at least one common fastening element, for example a screw, a bolt or a rivet. In this way, for example the resonance body component initially can be arranged on the wet-space side of a door inner skin, before subsequently the carrier component is mounted to the door bodyshell from the dry-space side, and subsequently the resonance body component and the carrier component jointly are finally fixed to the door bodyshell via at least one common fastening element. This may include a variant in which the resonance body component initially is arranged in a mounting position on the door skin, before, after mounting the carrier component to the door skin, the final fixation of the carrier component and the resonance body component is effected via the at least one common fastening element.

In one design variant, the resonance body component includes first and second component portions, wherein in a first component portion at least part of the speaker is received and a second component portion extends along the door skin portion of the door skin away from the first component portion. The first and second component portions jointly can define the resonance space for the speaker, wherein the speaker protruding into the resonance space is received merely in the first component portion of the resonance body component, which extends like a housing around the part of the speaker protruding into the resonance space. The second component portion then chiefly serves to increase the volume of the resonance space and/or to fix the resonance body component to the door skin and/or the carrier component. For example, the second component portion is of elongate design and extends along an edge of the door skin forming the door skin portion, which borders an opening in the door skin that is at least partly closed by the carrier component.

In one design variant, the vehicle door comprises a carrier component fixed to the door skin, by which, for separating the wet space from the dry space, an opening in the door skin is at least partly closed, without the carrier component being provided for a connection to the speaker. For the speaker, a speaker opening rather (merely) is provided in the door skin at a distance to the opening at least partly closed by the carrier component. Thus, the speaker opening for the speaker is provided in the door skin away from the carrier component and the opening at least partly closed by the carrier component. For forming the resonance space on the wet-space side it then consequently is not absolutely necessary in such a design variant that the resonance body component is located opposite a carrier portion of the carrier component. Rather, the resonance body component can extend here away from the opening at least partly closed by the carrier component and thus at a distance to the carrier component along a wet-space side of the door skin. Thus, in such a design variant the resonance body component alone in conjunction with the door skin forms a closed volume for the resonance-space of the speaker within the wet space of the vehicle door. The speaker mounted to the door skin, which is inserted into the door skin-side speaker opening, is acoustically coupled to the resonance body component via a speaker opening in the resonance body component adjoining the door skin-side speaker opening.

In another variant, a vehicle door can be provided without a carrier component. The resonance body component is fixed to the door skin, such as to a door inner skin, and forms a resonance space for a speaker mounted to the door skin. Thus, the solution described here also can easily be used in vehicle doors without a door module carrier, such as in vehicle doors in which no carrier component of usually flat extension is provided for the wet/dry space separation.

As already explained above, the resonance body component merely can extend along the first side of a door skin portion of the door inner skin facing the wet space. Alternatively, one design variant provides that at least one component portion of the resonance body component directly rests against a wet-space side of the carrier component facing the wet space.

In one design variant, a bass reflex box or a transmission line housing for the speaker is formed with the resonance body component. This may include the fact that the resonance body component is adapted and provided for forming a resonance body for sub-bass frequencies in the range of 30 to 50 Hz.

In this connection it can be provided for example that the resonance body component includes an opening for the speaker and at least one reflex tube or transmission line tube with an additional tube opening at a distance to the opening for the speaker. In a transmission line tube, a tube length can be dimensioned for example with lambda/4, i.e. a quarter of the wavelength, or a (preferably odd) multiple of lambda/4 ($\lambda/4$).

In a design variant with a transmission line tube the same comprises two tube portions within the resonance body component, which define a tube channel for sound waves propagating within the resonance body component, which has a course bent at least once by 180°. This may provide for a compact design of the resonance body component and a transmission line housing formed therewith within the wet space of the vehicle door.

Alternatively or additionally, a tube end of a reflex tube or a transmission line tube of the resonance body component, which includes the tube opening, can be received in a carrier opening of a carrier component that is fixed to the door skin for separating the wet space from the dry space. Thus, in this design variant—independently of whether or not the carrier component forms a speaker opening for the speaker—an opening in the carrier component in any case is provided for the tube portion forming the tube opening of the reflex tube or the transmission line tube. To maintain or improve the wet/dry space separation in the region of this tube end, a seal can possibly be provided on the carrier-side tube opening provided for the tube end.

For integrating at least one additional function into the resonance body component one design variant for example provides that at least one component portion of the resonance body component forms at least part of a crash pad within the vehicle door. Such a crash pad is adapted and provided for the absorption of deformation forces that act on the vehicle door due to an accident. The resonance body component, as part of a so-called "soundbox", thus additionally performs the function of a crash pad in order to influence the deformation of the vehicle door via a specifically permitted deformation. By means of a correspondingly shaped outer contour of the resonance body component, an insulation furthermore can be provided alternatively or additionally, in the light of which an insulation mat or spray insulation on a door outer panel, which otherwise is usually provided within the vehicle door, can be omitted.

Alternatively or additionally, at least one component portion of the resonance body component can be adapted and provided for guiding and/or supporting an adjustable window pane of the vehicle door in at least part of a provided adjustment range of the window pane. Thus, in such a variant the resonance body component performs a guiding and/or holding function for the adjustable window pane of the vehicle door. For example, the window pane is guided and/or supported by a component portion of the resonance body component within a permitted adjustment range, for example between a completely lowered first end position and a completely closed second end position and/or in a first or second end position, possibly also only in the first or second end position.

The vehicle door in principle can comprise a bodyshell group with a door inner skin and a door outer skin. The door skin bordering the wet space and the dry space then for example is formed by the door inner skin, opposite which the door outer skin of the vehicle door bordering the wet space is at least sectionally provided. In one design variant it is provided for example that the resonance body component is fixed to the door inner skin and/or to the door outer skin. Alternatively or additionally, the resonance body component can comprise a supporting portion via which at least one portion of the door outer skin is supported on the resonance body component.

Via the connection of the resonance body component to the door bodyshell of the vehicle door, which is formed at least by a door inner skin and a door outer skin, a door inner structure of the vehicle door can be stiffened for example by means of the resonance body component. This additional stiffening possibility initially also is independent of the wet-space side arrangement of the resonance body component to be achieved via the proposed solution. In any case, however, the simplification of the assembly of the vehicle door associated with the wet-space side arrangement of the resonance body component can be combined with such an additional stiffening function.

In one design variant, the resonance body component comprises a functional portion by which a cutout in the door skin is at least partly closed. The cutout in the door skin can be a cutout circumferentially enclosed by portions of the door skin in the sense of a through opening or a unilaterally open edge-side cutout. Regardless of the design of the cutout, the functional portion of the resonance body component can be inserted into the door skin-side cutout and at least partly fill the same. In this way, the resonance body component with its functional portion can form part of the door skin and hence of the door bodyshell. In such a design variant, the resonance body component thus performs the function of a door skin portion at least on an area of the door skin and integrates an additional function. In one example, the resonance body component with its functional portion can be inserted into a cutout of the door skin in the region of a door sill.

In principle, the resonance body component can form at least one water drain on an outer shell surface located within the wet space, via which liquid can be discharged from the shell surface of the resonance body component. Within the wet space, liquid is thus discharged from the resonance body component by utilizing the water drain of the resonance body component so that liquid, such as (rain) water, cannot collect thereon indefinitely. A water drain or a plurality of water drains on the resonance body component may be useful when the resonance body component extends across an entire width of the vehicle door within the wet space and/or the resonance body component at least partly closes a cutout in the door skin via a functional portion and hence forms part of the door bodyshell.

The proposed solution furthermore relates to a method for mounting a door assembly for a vehicle door in which a wet space is provided within the vehicle door, which is separated from a dry space on the vehicle door, the method comprising at least the following steps:

providing a door skin for the vehicle door, which borders the wet space (NR) and the dry space (TR), providing a speaker, and providing a resonance body component for forming a resonance space for the speaker.

In accordance with the proposed mounting method it furthermore is provided that the resonance body component is arranged within the wet space and defines a closed volume for the resonance space in the wet space of the vehicle door.

In one design variant of a proposed mounting method, the resonance body component for example is arranged with at least one component portion on a first side of a door skin portion of the door skin facing the wet space. As already explained above in connection with a proposed vehicle door, this may include the fact that the resonance body component is arranged away from an opening in the door skin, which is at least partly closed via a typically flat carrier component for the wet/dry space separation, which is to be mounted subsequently. Alternatively, the resonance body component can be arranged with at least one component portion on the first side of a door skin portion of the door skin facing the wet side, on whose second side facing the dry space a carrier portion of a carrier component is arranged, which carries the speaker. In the first-mentioned case, the speaker merely is fixed directly to the door skin. In the last case mentioned above, the speaker can in turn be pre-mounted on the carrier component and be attached to the door skin with the carrier component from the dry-space side so that the speaker merely is indirectly fixed to the door skin (via the carrier component).

In one design variant, the resonance body component with at least one component portion is arranged on a first side of a door skin portion of the door skin facing the wet space, before the carrier component with at least one carrier portion is arranged on a second side of the door skin portion facing the dry space.

For example, the door skin portion is formed by an edge bordering an opening in the door skin. The resonance body component then is arranged for example on the first side of this door skin portion, before the opening is at least partly closed by the carrier component for separating the wet space from the dry space. For this purpose the carrier component can be configured, for example, as a flat door module carrier.

In principle, the resonance body component initially can be arranged in a mounting position on the first side of a door skin portion facing the wet side and only after mounting further components, such as e.g. a carrier component, can be fixed to the door skin in an end position. This may include the fact that for taking its end position at at least one fastening point the resonance body component is fixed to the door skin via at least one fastening element, via which the carrier component mounted to the door skin is also fixed to the door skin. In the mounting position, the resonance body component thus initially is secured temporarily, until the final fixation is effected after mounting the carrier component.

A design variant of a proposed mounting method may be suitable for mounting a design variant of a proposed vehicle door. Correspondingly, the features and advantages of design variants of a vehicle door as explained above and below also apply for design variants of a proposed mounting method.

BRIEF DESCRIPTION OF THE DRAWINGS

The attached Figures by way of example illustrate possible design variants of the proposed solution.

In the drawings:

FIGS. 4A-4B show individual views of a design variant of a resonance body component 2 for the door module carrier of FIGS. 1A to 2;

FIGS. 10A-10C in various views show another design variant of a proposed vehicle door, in which a resonance body component is provided for stiffening the door bodyshell and a portion of a door outer skin of the vehicle door is supported on a resonance body component;

FIGS. 11A-11C in views corresponding with FIGS. 10A to 10C show a possible development of the design variant of FIGS. 10A to 10C with an alternatively designed resonance body component;

DETAILED DESCRIPTION

Figure 1A:
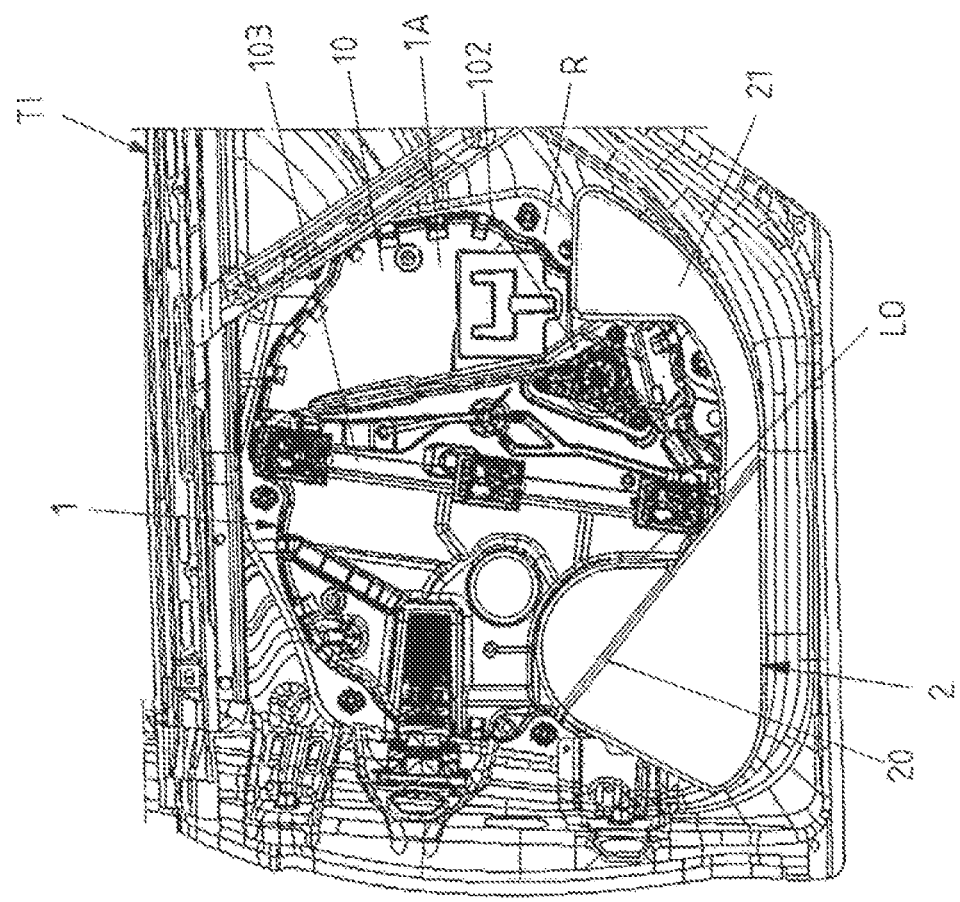
FIG. 1A sectionally shows a design variant of a proposed vehicle door with a view to the wet-space side of a door module carrier.
Figure 1B:
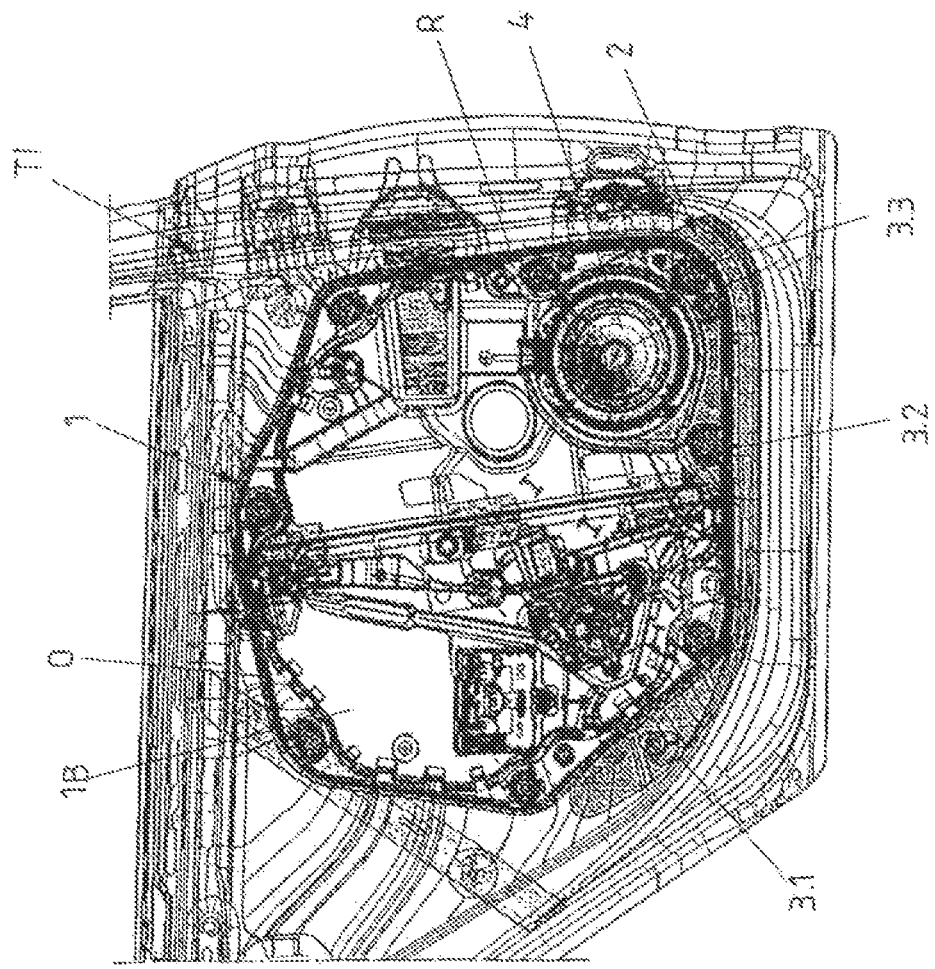
FIG. 1B shows the vehicle door of FIG. 1A with a view to a dry-space side.

With a view to different sides of a carrier component in the form of a flat door module carrier 1, FIGS. 1A and 1B sectionally show a vehicle door without a door outer skin. The vehicle door among other things comprises a door inner skin TI, which in a manner known per se together with the door outer skin not shown here defines a wet space NR within the vehicle door, which is sealingly separated from a dry space TR facing the vehicle interior by the flat door module carrier 1 (cf. FIG. 2). Within the wet space NR functional components of the vehicle door are arranged, such as for example functional components of a window regulator for the adjustment of a window pane of the vehicle door. Functional components at least partly are pre-mounted on the flat door module carrier 1, which then are properly positioned within the wet space NR via the door module carrier 1 through a module opening O formed in the door inner skin TI. For example, on a wet-space side 1A facing the wet space NR the door module carrier 1 therefor forms a carrier surface 10 to which functional components of the window regulator can be fixed. The carrier surface 10 for example forms a drive carrier portion 102 for a window regulator drive, a rail carrier portion 103 for a guide rail (for example for a single-strand or double-strand window regulator) and a speaker opening 104 for a speaker 4.

In the present case, the door module carrier 1 with the functional components pre-mounted thereon is mounted to the door inner skin TI at several fastening points proceeding from the dry space TR and is fixed to the door inner skin TI at an edge R circumferentially bordering the mounting opening O, which forms a door skin portion of the door inner skin TI. On a dry-space side 1B of the door module carrier 1 facing the dry space TR, functional components of the vehicle door can likewise be arranged. These include for example functional components of the window regulator drive to be protected from moisture.

Figure 2:
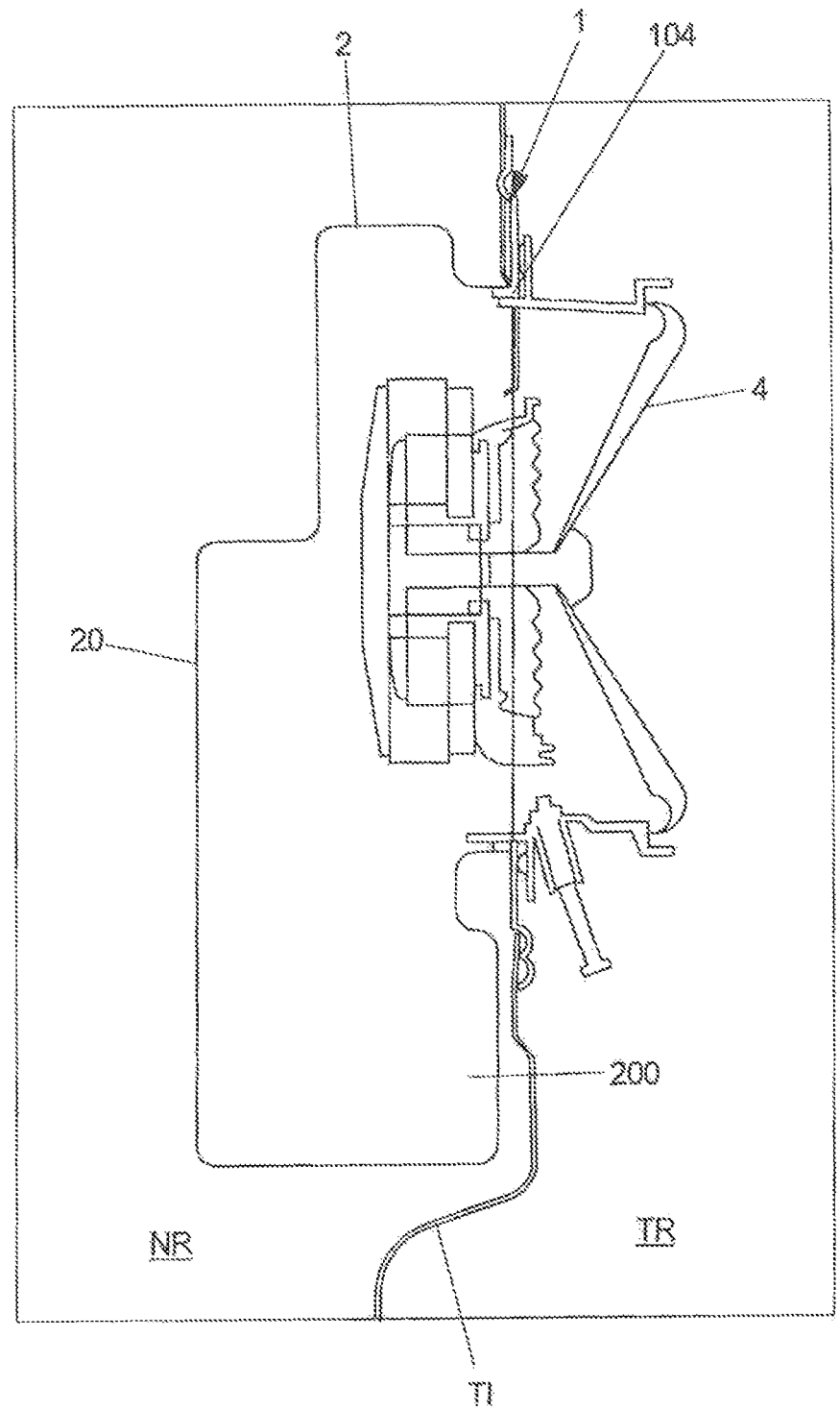
FIG. 2 shows a sectional representation of the vehicle door of FIGS. 1A and 1B in the region of a speaker arranged on the door module carrier.

To be able to provide a defined resonance space 20 within the wet space NR for the speaker 4 held on the door module carrier 1, the vehicle door shown in FIGS. 1A, 1B and 2 is provided with a sound or resonance body component 2 configured like a housing as an additional component. For forming the resonance space 200, the resonance body component 2 configured like a housing in the present case is arranged at the edge R on the wet-space side of the door inner skin TI—here in the region of a door base of the vehicle door. In this way, the resonance body component 4 defines a closed resonance space 200 with the edge R, to which the properly mounted speaker 4 is acoustically coupled and possibly protrudes into the same.

The resonance body component 2 forms two component portions 20 and 21. A first component portion 20 is arranged directly opposite a door skin-side speaker opening LO. Thus, on the wet-space side of the door inner skin TI the first component portion 20 completely covers the speaker opening LO of the door inner skin TI provided at the edge R. The speaker opening 104 provided on the side of the door module carrier, on which the speaker 4 is held, is aligned completely with the door skin-side speaker opening LO. Hence, when the door module carrier 1 is mounted to the door inner skin TI via the door skin-side speaker opening LO, the speaker 4 pre-mounted to the wet-space side 1A of the door module carrier 1 can protrude into the wet space NR and into the resonance space 200 of the resonance body component 2 mounted already to the door inner skin.

The second component portion 21 extends away from the first component portion 20 of the resonance body component 2, namely along the edge R of the door inner skin TI. In the present case, an elongate extension of the second component portion 21 is provided along the edge R, without the second component portion 21 protruding beyond the edge R into the module opening O. On the one hand, an increase of the resonance space 200 is achieved via the second component portion 21. On the other hand, the second component portion 21 can be used for fixing the resonance body component 2 to the door inner skin TI.

Figure 3:
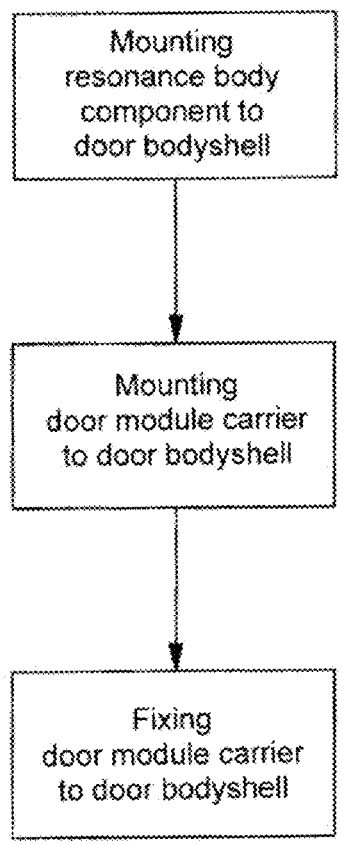
FIG. 3 shows a flow diagram for a design variant of a proposed mounting method.
Figure 5:
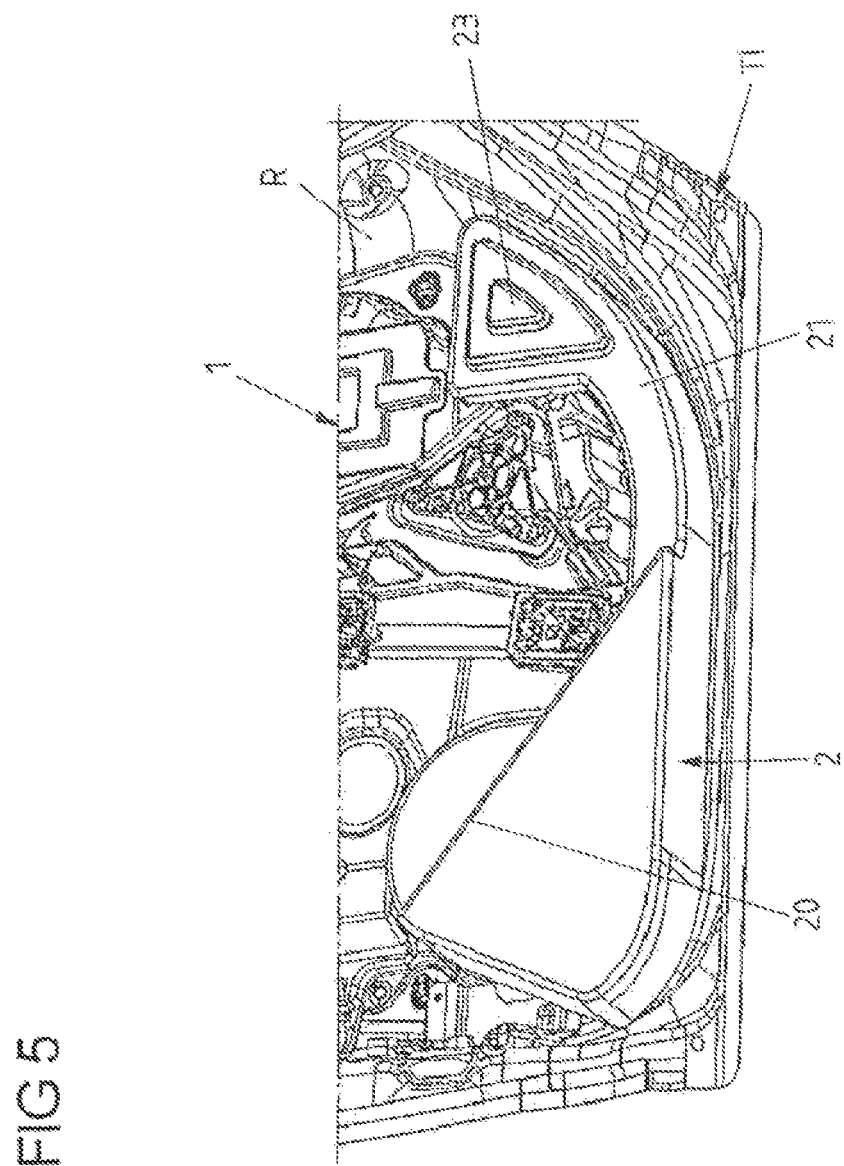
FIG. 5 shows an enlarged section of a vehicle door of FIG. 1A with a development of the resonance body component that forms part of a crash pad.

In principle, as is illustrated with reference to an exemplary flow diagram of FIG. 3, the resonance body component 2 initially can be mounted to the door inner skin TI and hence to a door bodyshell defined therewith on the wet-space side. For example, the resonance body component 2 therefor is arranged and hence initially "parked" in a mounting position at the edge R of the door inner skin TI on the side facing the wet space NR. Subsequently, the door module carrier 1 is mounted to the door inner skin TI and hence to the door bodyshell proceeding from the dry-space side. The speaker 4 can already be held at the door module carrier 1 or is only subsequently mounted to the door module carrier 1 proceeding from the dry-space side. The mounting of the door module carrier 1 to the door inner skin TI consequently involves the mounting of the speaker 4 held at the door module carrier 1 to the door inner skin TI, or the speaker 4 is inserted subsequently. In any case, the speaker 4 finally is acoustically coupled to the resonance body component 2 already pre-mounted to the door inner skin TI. A speaker opening in the resonance body component 2 then is also closed thereby, which is located opposite the door skin-side speaker opening LO and the carrier component-side speaker opening 104. The resonance body component 2 hence forms a closed volume within the wet space NR, which is provided as a resonance space 200 for the speaker 4. After mounting the door module carrier 1 to the door inner skin TI, in order to close the module opening O by the door module carrier 1, the door module carrier 1 in any case is fixed to the door inner skin TI and hence to the door bodyshell.

For fixing the door module carrier 1 to the door inner skin TI, a plurality of fastening points at the edge R are used. Individual fastening points 3.1, 3.2 and 3.3 may be provided in a region of the edge R of the door inner skin TI, on which the resonance body component 2 is arranged. One or more (at least two) of these fastening points 3.1, 3.2 and 3.3 then can be used for example for jointly fixing the door module carrier 1 and the resonance body component 2 to the door inner skin TI. Then, for example, the resonance body component 2 initially present in a mounting position then is also transferred into an end position and fixed to the door inner skin TI only via the fixation of the door module carrier 1 to the door inner skin TI. At a fastening point 3.1, 3.2 or 3.3 a common fastening element thus can be used for fixing the door module carrier 1 and the resonance body component 2 at the same time, which rest on different sides of the edge R of the door inner skin TI extending around the module opening O.

Via the resonance body component 2 of the vehicle door of FIGS. 1A, 1B and 2, via which a resonance space 200 of defined size is formed for the speaker 4 in a region close to the door base, for example a bass reflex system or a transmission line system can easily be realized in the vehicle door. A corresponding so-called "soundbox" formed by the resonance body component 2 thus increases the efficiency of the speaker and extends a bass range towards low frequencies.

In individual views and on an enlarged scale, FIGS. 4A and 4B show the resonance body component 2 designed here like a housing with the different component portions 20, 21 and an opening 22 for introducing a part of the speaker 4 into the resonance space 200 defined by the resonance body component 2.

Figure 6:
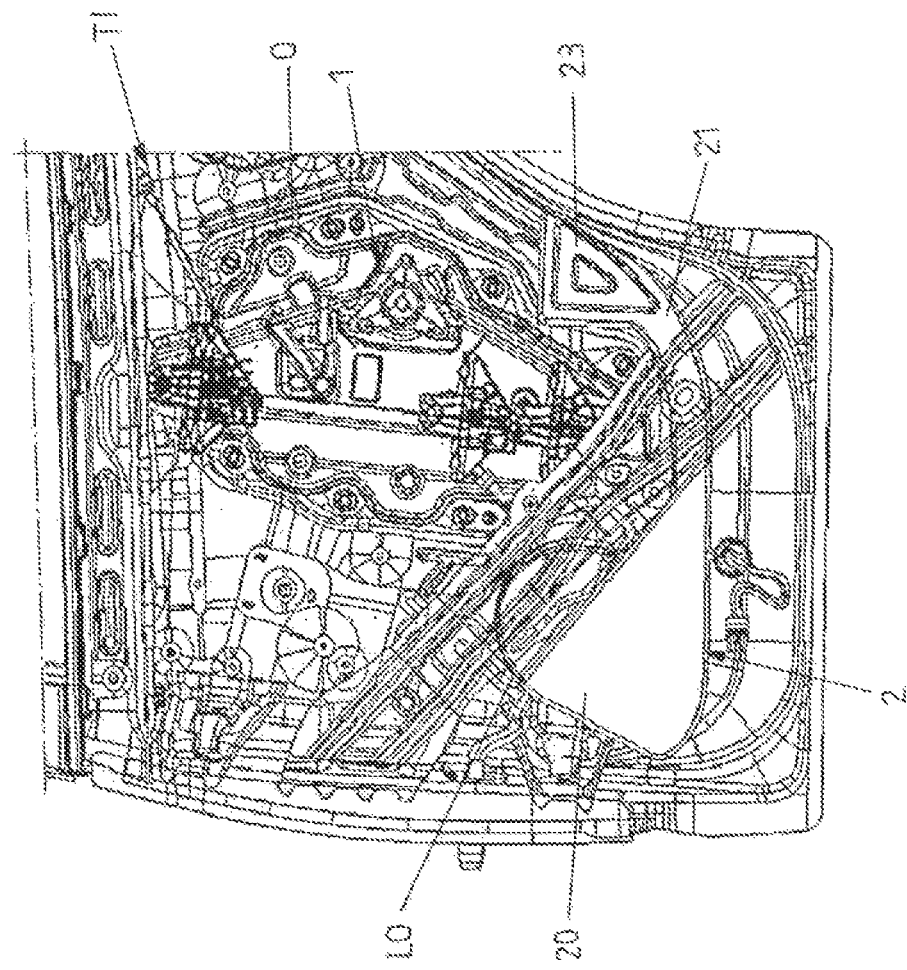
FIG. 6 sectionally shows another design variant of a proposed vehicle door with a view to a wet-space side of a door module carrier, at a distance to which a speaker and a resonance body component for the speaker are arranged on a door inner skin of the vehicle door.

Via an outside of the resonance body component 2 facing the door outer skin of the vehicle door, a guidance and/or support of a window pane to be adjusted within the wet space NR (at least into its lowered bottom end position) furthermore can be provided. In addition, the resonance body component at least sectionally protruding in the direction of the door outer skin can form a crash pad or at least part of a crash pad within the vehicle door. Such a variant is shown in FIG. 6 by way of example. A crash pad 23 here is formed on the component portion 21 of the resonance body component 2. In the event of a crash, the deformation behavior of the vehicle door thus can be influenced via a specifically permitted deformation of the resonance body component 2. Furthermore, due to a correspondingly shaped outer contour of the resonance body component, an insulation mat or spray insulation on a door outer skin can be omitted, as it can regularly be found in practice so far, such as when the door outer skin TI is configured as a door inner panel and the door outer skin is configured as a door outer panel.

In addition, FIG. 6 by way of example illustrates a design variant in which the door inner skin TI has a module opening O closed by a door module carrier 1. However, in the design variant shown in FIG. 6 the door module carrier 1 does not carry the speaker 4. The speaker 4 rather can be mounted to the door inner skin TI independently of the door module carrier 1. The door inner skin TI forms a speaker opening LO for the door module carrier 1 away from the module opening O. In the region of this speaker opening LO the resonance body component 2 is arranged on the wet-space side with the first component portion 20. The elongate second component portion 21 extending away from the same likewise extends on the wet-space side along the door inner skin TI. For example, the resonance body component with the second component portion 21 extends along the edge of the module opening O, but without protruding beyond an edge portion towards the door module carrier 1. The resonance body component 2 of the design variant of FIG. 6 thus is not located opposite a portion of the door module carrier 1 with any of its component portions 20 or 21.

The elongate second component portion 21 of the resonance body component 2 in principle can be configured as a reflex tube for the speaker 4 and can be dimensioned correspondingly. In the design variant of FIG. 6 the crash pad 23 additionally is formed on an outside of the second component portion 21 facing the door outer skin.

Figure 7:
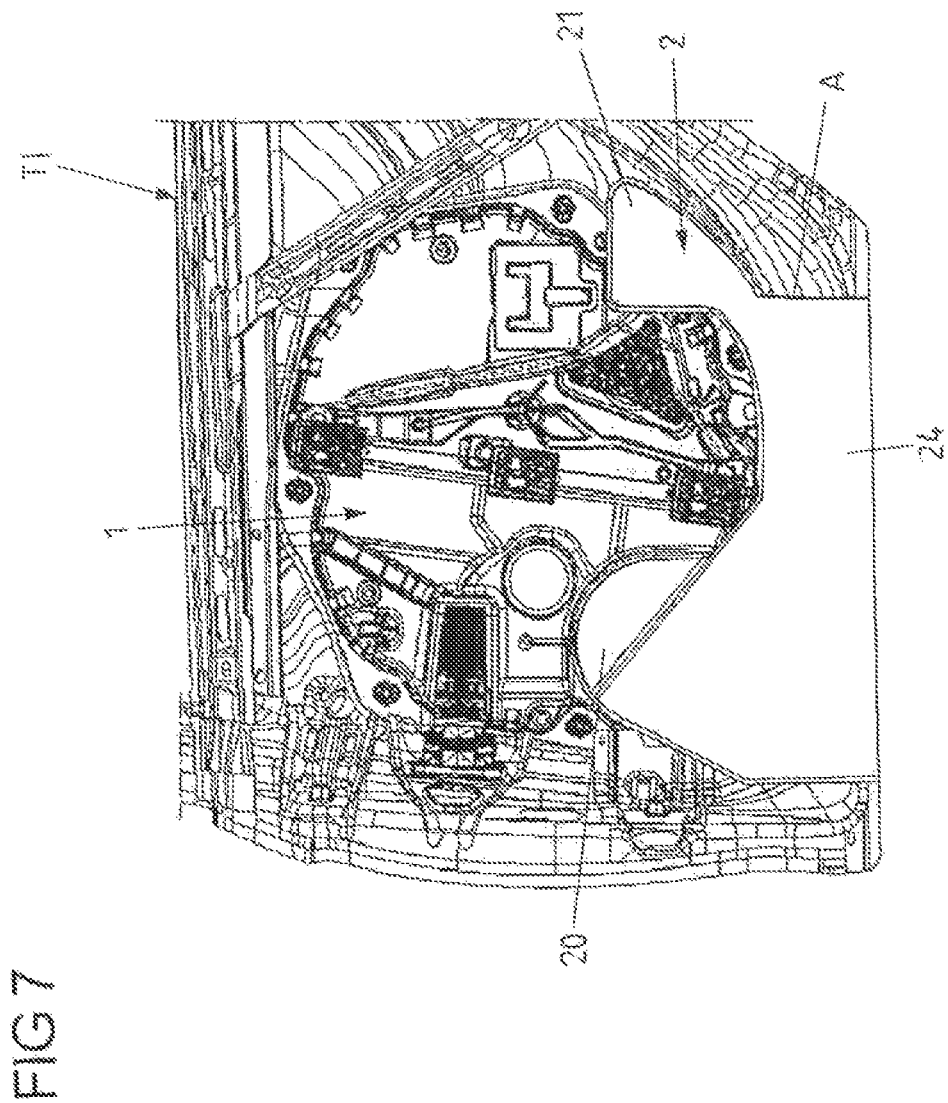
FIG. 7 sectionally shows another design variant of a proposed vehicle door, in which a resonance body component for a speaker additionally closes a cutout in a door inner skin of the vehicle door and hence performs part of a function of the door inner skin.

FIG. 7 illustrates a design variant of a proposed vehicle door, in which the resonance body component 2 additionally forms a functional portion 24 which in the mounted state of the vehicle door represents a part of the structure of the door bodyshell and hence performs a supporting function as part of the door inner skin TI. The functional portion 24 is inserted into a cutout A on the door inner skin TI and fills the same. The cutout A here is formed to be unilaterally open towards an underside of the vehicle door in a sill region of the vehicle door. The functional portion 24 of the resonance body component 2 is inserted into the cutout A so as to fill this cutout A. The resonance body component 2 as a so-called "soundbox" thus can perform functions of the door bodyshell and of the door inner skin TI in a lower (sill) region so that no door panel is necessary in this region.

In principle, when inserted with a functional portion 24 into a cutout A of the door inner skin TI, the resonance body component 2 can absorb loads occurring in operation or also in the event of a crash via its attachment to the door inner skin TI—and possibly to a door module carrier 1—and transmit such loads into the components and structures connected thereto. Correspondingly, it may be recommendable to mold the resonance body component 2 from a plastic material whose strength substantially corresponds to or exceeds the strength of that material from which a door module carrier 1 of the vehicle door is made.

In all illustrated exemplary embodiments, the sound transmission properties of the vehicle door or a door system formed therewith can be improved by decoupling a speaker membrane in the wet space NR by means of the resonance body component 2. This also improves a transfer path for sound waves generated. At the same time, an excitation of components of the vehicle door, such as a door outer skin and components present in the wet space NR by the sound pressure of the speaker 4, can be reduced. This in turn involves a reduction of disturbing noises with an increase in audio quality at the same time via audio signals output by the speaker 4.

Figure 8A:
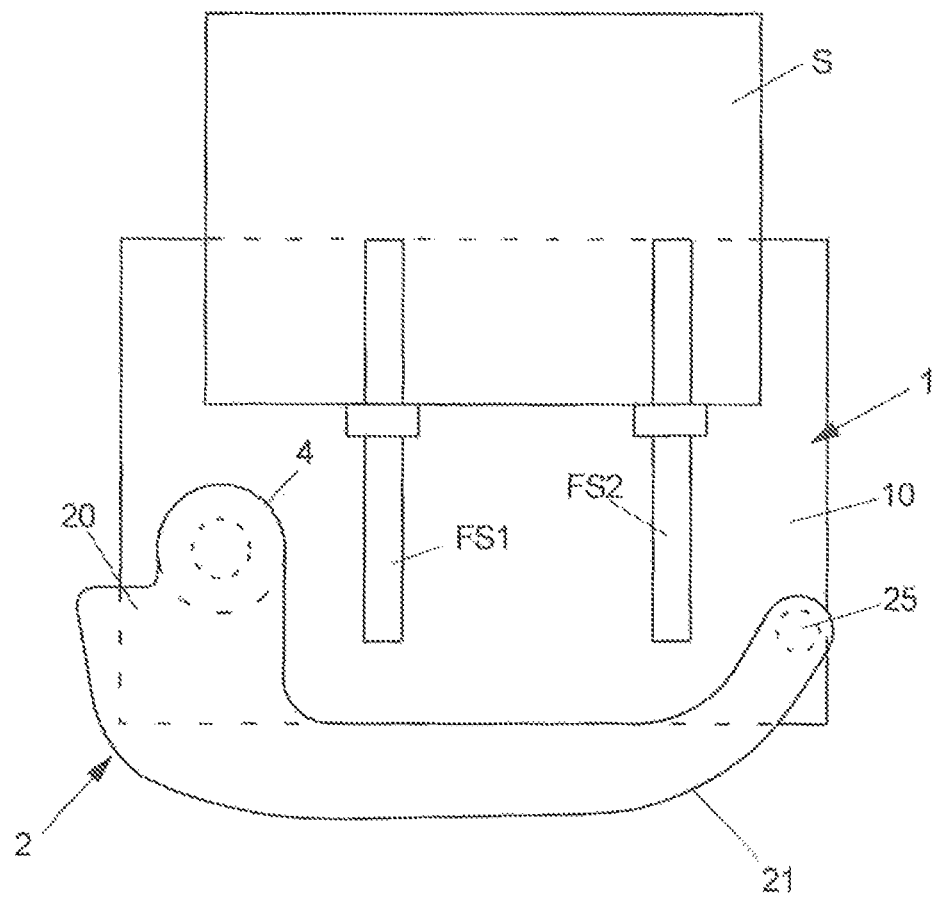
FIG. 8A with a view to a wet-space side of a door module carrier shows another design variant of the proposed solution, in which the resonance body component forms a reflex tube.
Figure 8B:
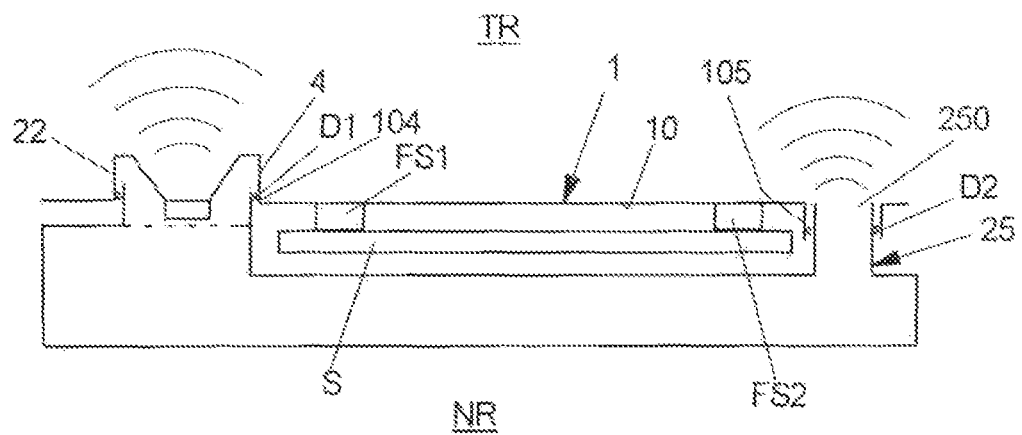
FIG. 8B shows a sectional view of FIG. 8A.

FIGS. 8A and 8B show a another design variant of the proposed solution. In the design variant shown in FIGS. 8A and 8B a double-strand window regulator comprising two guide rails FS1 and F S2 for adjusting a window pane S is fixed to the door module carrier 1. A resonance body component 2 here is configured with a reflex tube 25 for forming a bass reflex box.

The longitudinally extending component portion 21 of the resonance body component 21 therefor configures the reflex tube 25 with a reflex tube opening 250. A portion of the reflex tube 25 is received in a carrier opening 105 of the door module carrier 1 configured as a through opening so that the reflex tube opening 250 is accessible in the dry space TR and sound waves can be emitted into the dry space TR. In the exemplary embodiment shown in FIGS. 8A and 8B by way of example, the resonance body component 2 is configured and dimensioned in such a way that the spaced openings 22 and 250 for the speaker 4 and of the reflex tube 25 of the resonance body component 2 are aligned with the carrier-side openings 104 and 105 and the guide rails FS1 and FS2 rest on the door module carrier 1 between the respective pair of openings 22/250 and 104/105.

Figure 9A:
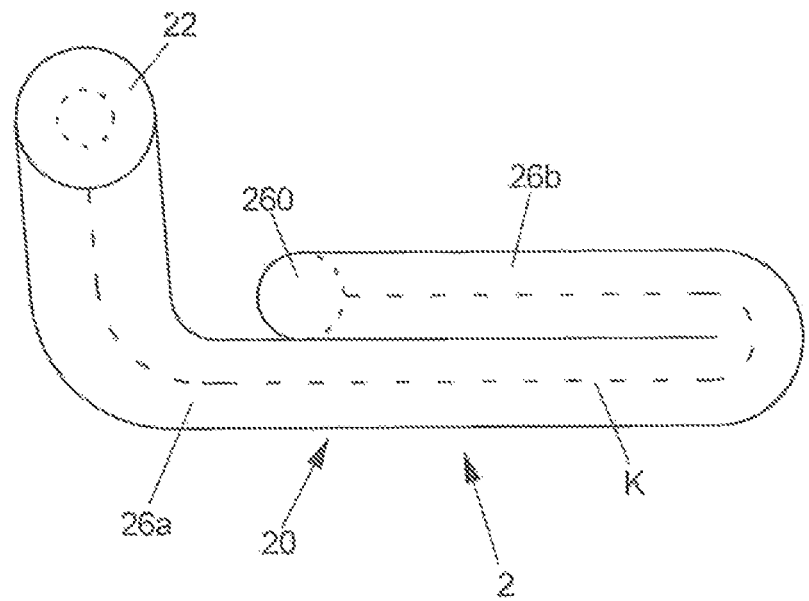
FIG. 9A shows another design variant of a proposed resonance body component, which forms a transmission line housing with a transmission line tube.
Figure 9B:
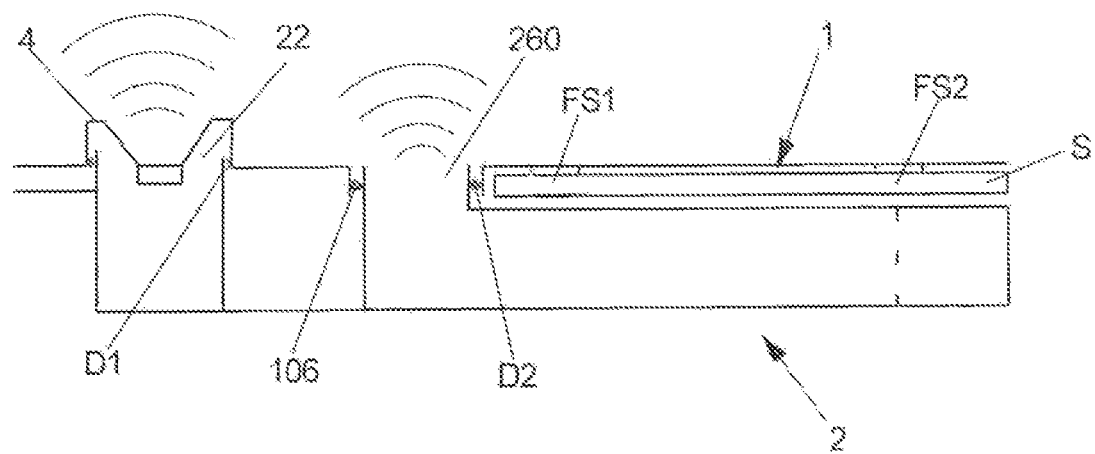
FIG. 9B in a view corresponding with FIG. 8B sectionally shows a vehicle door with the resonance body component of FIG. 9A.

In the design variant of FIGS. 9A and 9B a transmission line tube with tube portions 26a and 26b is formed with the resonance body component 2. The tube portions 26a and 26b here define a tube channel K within the resonance body component 2, which extends from the opening 22 of the resonance body component 2 for the speaker 4 and within the resonance body component 2 has a course bent at least once by 180°. Sound waves exiting at an open tube end 260 of the transmission line tube 26a, 26b thus have propagated along a propagation path deflected at least once by 180° along the tube channel K. Due to the design of the tube channel K it becomes possible that the opening 22 for the speaker 4 and the tube end 260 of the transmission line tube 26a, 26b are arranged at a comparatively small distance to each other, such as at a distance that only corresponds to a fraction of a total width of the resonance body component 2 and a total length of the tube channel K within the resonance body component 2. In contrast to the design variant of FIGS. 8A and 8B, the opening 22 for the speaker 4 and the tube end 260 of the transmission line tube 26a, 26b thus are located one beside the other adjacent to a guide rail FS1. The guide rails FS1, FS2 thus do not extend in a clearance between the opening 22 for the speaker 4 and the tube end 260.

The tube length of the tube channel K moreover is dimensioned in such a way that the tube length λ/4 respectively corresponds to a multiple of a quarter of the wavelength of a fundamental wave defined with the transmission housing of the resonance body component 2.

Furthermore, in both design variants of FIGS. 8A, 8B and 9A, 9B the regions of the resonance body component 2 protruding into the dry space TR are sealed with respect to the wet space NR via seals D1 or D2 at the speaker 4 on the one hand and at the reflex tube opening 250 or the tube end 260 of the transmission line tube 26a, 26b on the other hand.

Figure 10A:
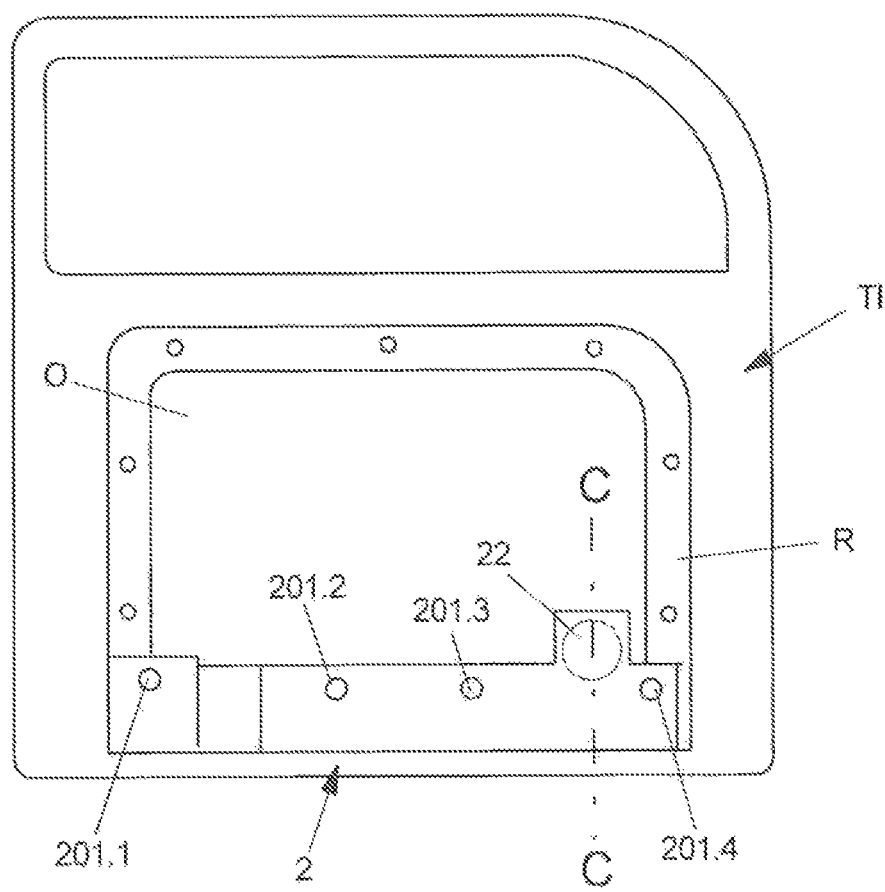

FIGS. 10A, 10B and 10C illustrate another design variant of the proposed solution, in which a resonance body component 2 forms part of the door structure of the door bodyshell. The resonance body component 2 of FIGS. 10A to 10C may extend beyond a lower edge region of the module opening O for the door module carrier 1 in a cutout of the door inner skin TI provided for this purpose and merging into the module opening O. In this way, the door module carrier 1 can be properly fixed to the door bodyshell at several fastening points 201.1 to 201.4 of the resonance body component 2.

For separately fixing the resonance body component 2 to the door inner skin TI the resonance body component 2 in the design variant of FIGS. 10A to 10C in turn includes lateral fastening portions in the form of lateral fastening tabs 27. Via these lateral fastening tabs 27 the resonance body component 2 is each fixed to a front side of the door inner skin TI, for example via at least one screw, one bolt, one rivet and/or a welded joint. For example, it can be provided in this connection that the door inner skin TI or a door inner frame defined therewith is formed from a deep-drawn plate or from a molded part.

Furthermore, the resonance body component 2 can also include a supporting portion for supporting a door outer skin TA located opposite the door inner skin TI and bordering the wet space NR. Then, at least one portion of the door outer skin TA facing the wet space NR—in FIG. 10B in a lower door region at which the door outer skin TA and the door inner skin TI are fixed to each other via a fastening tab L—rests against the resonance body component 2. In the design variant of FIGS. 10A to 10C such a supporting portion is formed by a supporting plate 28, which in the present case is obliquely angled from a component portion of the resonance body component 2 and is wedge-shaped in the cross-sectional view. The supporting plate 28 forms a supporting surface 280 on which the door outer skin TA is supported in the properly mounted state of the vehicle door. Thus, the resonance body component 2 performs an additional stiffening function within the door bodyshell.

Figure 12:
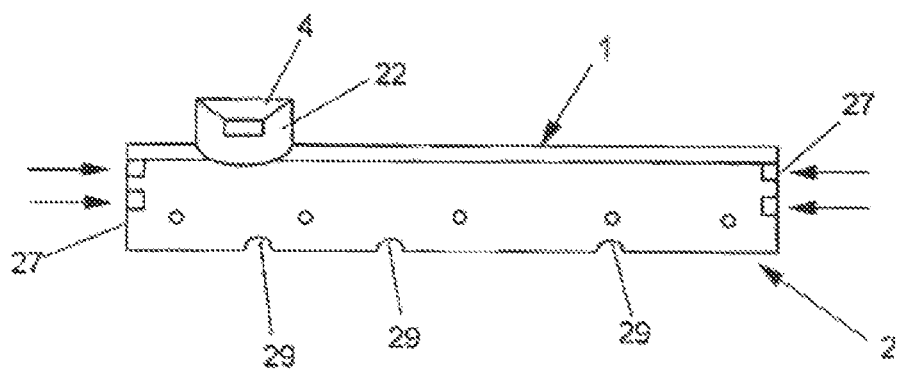
FIG. 12 shows a configuration of the resonance body component of FIGS. 10A to 11C, which extends across an entire width of a wet space and includes a plurality of water drains.

To avoid an accumulation of liquid on an outer shell surface of the resonance body component 2, and in a region of transition to the supporting plate 28, such as in the case of the resonance body component 2 extending across the entire width of the wet space NR between the two lateral fastening tabs 27, a plurality of water drains 20 are formed on the resonance body component 2 of FIGS. 10A, 10B and 10C (see the enlarged representation of FIG. 10C). Such a water drain 29 for example is molded to the resonance body component 2 formed like a housing as a continuous or unilaterally open channel. Furthermore, FIG. 12 by way of example illustrates the distribution of a plurality of water drains 29 across a width of the resonance body component 2.

Such a configuration moreover can also be provided in a resonance body component 2 of FIGS. 11A, 11B and 11C. In contrast to the design variant of FIGS. 10A to 10C, a supporting portion 28 for at least locally supporting the door outer skin TA is designed differently in a design variant of FIGS. 11A to 11C. The supporting portion 28 here as well is an integral part of the resonance body component 2, but is not formed by an angled, wedge-shaped portion. Rather, the supporting portion 28 here extends transversely (in the Y-direction) and is of web-shaped design. In addition, in the design variant of FIGS. 11A to 11C the door module carrier 1 need not necessarily be fixed to the resonance body component 2 for covering the module opening O, as this is provided in the design variant of FIGS. 10A to 10C.

The design variants of FIGS. 10A to 12 may illustrate that by integrating the resonance body component 2 in the door bodyshell the door inner skin TI can be molded more easily and be formed with less material at least in that region in which the resonance body component 2 is provided. This can result in a weight reduction and an easier assembly of the resonance body component, possibly combined with an increase of the rigidity of the door bodyshell. In addition, an assembly of the resonance body component 2 along a mounting direction Y (cf. FIG. 10B) is facilitated, which mounting direction points from the dry space TR to the door outer panel TA. The resonance body component 2 can be arranged on the door bodyshell and be pre-mounted thereto along the mounting direction Y, before the door module carrier 1 is attached to the door bodyshell along the same mounting direction Y.

LIST OF REFERENCE NUMERALS 1 door module carrier (carrier component)
10 carrier surface
102 drive carrier portion
103 rail carrier portion
104 speaker opening
105 carrier opening (for reflex tube)
106 carrier opening (for tube end of the transmission line tube)
1A wet-space side
1B dry-space side
2 resonance body component
20, 21 component portion
200 resonance space
201.1-201.4 fastening point
22 opening
23 crash pad
24 functional portion
25 reflex tube
250 reflex tube opening
260 open tube end
26a, 26b tube portion
27 lateral fastening tab (fastening portion)
28 supporting plate (supporting portion)
280 supporting surface
29 water drain
3.1, 3.2, 3.3 fastening point
4 speaker A cutout
FS1, FS2 guide rail
K tube channel
L fastening tab
LO (door skin-side) speaker opening
NR wet space
O module opening
R edge (door skin portion)
S window pane
TA door outer skin
TI door inner skin
TR dry space
Y mounting direction

The invention claimed is:

1. A vehicle door, comprising:
a wet space provided within the vehicle door, wherein the wet space is separated from a dry space on the vehicle door, wherein the vehicle door includes at least:
a door inner skin which borders the wet space and the dry space,
a door outer skin, the door inner skin and the door outer skin collectively defining the wet space,
a speaker, and
a resonance body component configured to form a resonance space for the speaker on the vehicle door, wherein the resonance body component defines a closed volume for the resonance space in the wet space of the vehicle door, wherein with at least one component portion the resonance body component is arranged on a first side of a door skin portion of the door inner skin facing the wet space; and
a carrier component fixed to the door inner skin configured to separate the wet space from the dry space, wherein the resonance body component is connected to the carrier component, wherein with the at least one component portion the resonance body component is arranged on the first side of the door skin portion of the door inner skin facing the wet space, and with at least one carrier portion the carrier component is arranged on a second side of the door inner skin portion face the dry space.

2. The vehicle door of claim 1, wherein the door skin portion on which, on different sides facing away from each other, portions of the resonance body component and of the carrier component are arranged, is formed by an edge that borders an opening in the door inner skin, which is at least partly closed by the carrier component for separating the wet space from the dry space.

3. The vehicle door of claim 2, wherein the door skin portion is at least partly arranged between the at least one component portion of the resonance body component and the carrier portion.

4. The vehicle door of claim 3, wherein the carrier portion rests against the second side of the door skin portion, on whose first side the at least one component portion of the resonance body component is arranged, and includes a speaker opening for the speaker.

5. The vehicle door of claim 4, wherein the speaker opening of the carrier component is aligned with a door skin-side speaker opening of the door inner skin.

6. The vehicle door of claim 5, wherein at least one component portion of the resonance body component directly rests against a wet-space side of the carrier component facing the wet space.

7. The vehicle door of claim 6, wherein at least one fastening point the carrier component and the resonance body component are connected to the door inner skin and fixed to the same via at least one common fastening element.

8. The vehicle door of claim 1, wherein the vehicle door includes the carrier component fixed to the door skin configured to separate the wet space from the dry space, an opening in the door inner skin is at least partly closed, and a speaker opening on the speaker at the door inner skin at a distance to the opening at least partly closed by the carrier component.

9. The vehicle door of claim 8, wherein the resonance body component includes first and second component portions, wherein in a first component portion at least part of the speaker is received and a second component portion extends along the door skin portion of the door inner skin away from the first component portion.

10. The vehicle door of claim 9, wherein the first and second component portions of the resonance body component are arranged on the door inner skin away from the opening at least partly closed by the carrier component and hence at a distance to the carrier component.

11. The vehicle door of claim 10, wherein a bass reflex box or a transmission line housing is formed with the resonance body component.

12. The vehicle door of claim 11, wherein the resonance body component includes an opening for the speaker and at least one reflex tube or a transmission line tube with an additional tube opening that is arranged at a distance to the opening for the speaker.

13. The vehicle door of claim 12, wherein the transmission line tube of the resonance body component includes two tube portions which define a tube channel for sound waves propagating within the resonance body component, which has a course bent at least once by 180°.

14. The vehicle door of claim 13, wherein a tube end of the reflex tube or of the transmission line tube including the tube opening is received in a carrier opening of a carrier component that is fixed to the door inner skin for separating the wet space from the dry space.

15. The vehicle door of claim 14, wherein at least one component portion of the resonance body component forms at least part of a crash pad within the vehicle door, which is adapted and provided for absorbing deformation forces that act on the vehicle door due to an accident.

16. The vehicle door of claim 15, wherein at least one component portion of the resonance body component is adapted and provided for guiding and/or supporting an adjustable window pane of the vehicle door in at least part of a provided adjustment range of the window pane.

17. The vehicle door according to claim 16, wherein the door skin bordering the wet space and the dry space is the door inner skin of the vehicle door, opposite which the door outer skin of the vehicle door bordering the wet space is at least sectionally arranged, and the resonance body component comprises a supporting portion via which at least one portion of the door outer skin is supported on the resonance body component.

18. The vehicle door according to claim 17, wherein the resonance body component comprises a functional portion by means of which a cutout in the door inner skin is at least partly closed.

19. The vehicle door according to claim 18, wherein on an outer shell surface located within the wet space the resonance body component forms at least one water drain via which liquid can be discharged from the shell surface of the resonance body component.

20. A method for mounting a door assembly for a vehicle door, the method comprising:

providing an inner door skin of the vehicle door;
providing an outer door skin of the vehicle door, wherein the inner door skin and the outer door skin collectively define a wet space and a dry space, wherein the dry space is separate from the wet space;
providing a speaker; and
providing a resonance body component for forming a resonance space for the speaker, wherein the resonance body component is arranged within the wet space and for the resonance space a closed volume is defined in the wet space of the vehicle door and wherein with at least one component portion the resonance body component is arranged on a first side of a door skin portion of the door skin facing the wet space; and
providing a carrier component to be fixed to the door inner skin, wherein the carrier component is provided on the vehicle door for separating the wet space from the dry space, and wherein the resonance body component is arranged with the at least one component portion on the first side of the door skin portion of the door inner skin facing the wet space, before the carrier component is arranged with at least one carrier portion on a second side of the door skin portion facing the dry space.

21. The method of claim 20, wherein the door skin portion is formed by an edge bordering an opening in the door inner skin and the resonance body component is arranged on the first side of the door skin portion, before the opening is at least partly closed by the carrier component for separating the wet space from the dry space.

22. The method of claim 21, wherein the resonance body component initially is arranged in a mounting position on the first side of the door skin portion and is fixed in an end position only after mounting the carrier component to the door inner skin.

23. The method of claim 22, wherein for taking its end position at least one fastening point the resonance body component is fixed to the door inner skin via at least one fastening element, via which the carrier component is also fixed to the inner door skin.

* * * * *